United States Patent Office 2,700,055
Patented Jan. 18, 1955

2,700,055

PREPARATION OF ETHYLENE SULFONAMIDES

Harold F. Park, East Longmeadow, Mass., assignor to Monsanto Chemical Company, St. Louis, Mo., a corporation of Delaware No Drawing. Application March 1, 1952, Serial No. 274,514

6 Claims. (Cl. 260—556)

This invention relates to ethylene monosulfonamide and ethylene disulfonamide. More particularly the invention relates to a process for preparing ethylene mono- and di-sulfonamides.

Ethylene sulfonamide and ethylene disulfonamide are unsaturated compounds sometimes known as vinyl sulfonamide and vinylidene sulfonamide respectively. Theoretically it should be possible to prepare these compounds from the corresponding ammonium salts of ethylene sulfonic and disulfonic acids by a simple dehydration procedure with the usual catalysts such as phosphorous pentoxide, magnesium perchlorate, aluminum oxide, silica, zeolite, $H_2SO_4$, etc. Every attempt to carry out the dehydration, even with particular care with regards to temperature conditions, has resulted in a black, insoluble tar.

One object of this invention is to provide vinyl sulfonamide and vinylidene sulfonamide.

A further object is to provide a process for the preparation of vinyl sulfonamide and vinylidene sulfonamide.

These and other objects are attained by mixing a small quantity of sulfur or a phenol with ethylene monosulfonic acid or disulfonic acid ammonium salts followed by dehydration of the salts.

The following examples are given in illustration and are not intended as limitations on the scope of this invention. Where parts are mentioned they are parts by weight.

*Example I*

Mix 100 parts of pulverulent ammonium ethylene monosulfonate with 0.0001 part of powdered sulfur. Cool the mixture to −20° C. with solid carbon dioxide and add to the cold mixture 100 parts of finely divided phosphorous pentoxide. Allow the mixture to remain at −20° C. for about 12 hours under constant agitation. Add the mixture slowly to a large excess of cool water. The product is an aqueous solution of phosphoric acid and ethylene monosulfonamide containing the small amount of sulfur suspended therein. The ethylene monosulfonamide may be recovered from the aqueous medium by evaporation of the water and it may then be purified by extraction with ethanol followed by crystallization from the ethanol solution. It is a white solid which may be polymerized alone or may be copolymerized with other unsaturated compounds.

*Example II*

Mix 100 parts of a pulverulent mixture of ethylene monosulfonic acid ammonium salt and ethylene disulfonic acid ammonium salt with 0.0001 part of hydroquinone. Cool the mixture to about −20° C. with solid carbon dioxide and add 300 parts of finely divided magnesium perchlorate. Agitate the mixture at about −20° C. for about twenty hours. Then pour the mixture slowly into an excess of cold water with constant agitation. A solution of vinyl and vinylidene sulfonamides in water containing a small amount of magnesium perchlorate is obtained. The sulfonamides may be recovered as a mixture by the evaporation of the water from the reaction product. They may then be separated by fractional crystallization from ethanol solution.

*Example III*

Heat 100 parts of ammonium ethylene monosulfonate at 300° C. at a reduced pressure of about 40 mm. of mercury, in admixture with 0.001 part of powdered sulfur. The ammonium salt is quickly dehydrated to vinyl sulfonamide which is volatile at 300° C. and 40 mm. pressure. Collect the vinyl sulfonamide by passing its vapors through a suitable condenser. No significant amount of insoluble tarry residue is obtained. If the ammonium ethylene sulfonate is subjected to the same condition without the admixture of sulfur or a phenol, a worthless tar is obtained and no vinyl sulfonamide can be recovered.

The starting materials of this invention are ammonium salts of mono and disulfonic acids of ethylene. If only one sulfonic acid group is present, the compound is vinyl sulfonic acid. If two sulfonic acid groups are present, they may be on the same or different carbon atoms. Where they are on the same carbon atom, the compound may be called vinylidene sulfonic acid or 1,1-ethylene disulfonic acid. When there is a sulfonic acid group on each of the carbon atoms, the compound may be called 1,2-ethylene disulfonic acid. The ammonium salts of each of these compounds may be converted to the corresponding sulfonamides by the process of this invention.

In order to obtain the ethylene sulfonamides of this invention they must be admixed with small amounts of sulfur or a phenol before the dehydrating action is started. Among the phenols which may be used are hydroquinone, tertiary butyl catechol, para tertiary amyl phenol, resorcinol, catechol, phenol, etc. Most effective are the para tertiary alkyl monohydric phenols, the dihydric phenols, and the tertiary alkyl dihydric phenols. The amount to be used may vary between 0.0001 and 0.01 part per 100 parts of ammonium ethylene sulfonate.

Various methods may be used to accomplish the dehydration. Dehydration catalysts such as phosphorous pentoxide and magnesium perchlorate may be used. The reaction should be carried out at relatively low temperatures i. e. from −40° C. to 40° C. in the solid phase. At higher temperatures with these catalysts, the reaction is too vigorous and a tar is formed regardless of the presence of sulfur or phenol.

Metal oxide dehydrating catalysts such as aluminum oxide, thorium oxide, chromic oxide and tungsten pentoxide may be used at higher temperatures such as from 80 to 300° C. At these temperatures with the metal oxide catalysts, no tar is formed. The product is solid and is recovered from the reaction mixture by dissolving it in ethanol and crystallizing the sulfonamides therefrom.

The dehydration may also be carried out at elevated temperatures of 250 to 400° C. At these temperatures, the sulfonamides are volatile. The dehydration may be accomplished without catalysts by blowing a stream of hot inert gas through the salts. The stream of hot gas carries the sulfonamide away from the reaction zone as fast as it is formed and the sulfonamides are collected in suitable cooled receivers. The reaction may also be carried out under a vacuum of 40 mm. or less of mercury pressure. Again the sulfonamides are volatilized as soon as they are formed and may be collected in suitable cool receivers.

It is not necessary to start with a pure sulfonic acid salt since a mixture of mono and disulfonic acid salts may be dehydrated by the process of this invention to yield a mixture of sulfonamides. The mixture may be resolved into the separate components by fractional crystallization from alcoholic solutions thereof.

It is obvious that variations may be made in the products and processes of this invention without departing from the spirit and scope thereof as defined by the appended claims.

What is claimed is:

1. A process which comprises mixing the ammonium salt of a compound taken from the group consisting of the mono- and disulfonic acids of ethylene, with a minor amount of a compound taken from the group consisting of sulfur and phenols, and thereafter subjecting the mixture to a temperature of from −40° C. to +40° C. in the presence of a dehydration catalyst taken from the group consisting of phosphorous pentoxide and magnesium perchlorate.

2. A process as in claim 1 wherein the compound mixed with the ammonium salt is sulfur.

3. A process as in claim 1 wherein the compound mixed with the ammonium salt is a phenol.

4. A process as in claim 1 wherein the compound mixed with the ammonium salt is hydroquinone.

5. A process which comprises mixing the ammonium salt of ethylene monosulfonic acid with a small quantity of sulfur and thereafter subjecting the mixture to a temperature of from −40° C. to +40° C. in the presence of phosphorous pentoxide.

6. A process which comprises mixing the ammonium salt of ethylene monosulfonic acid with a small quantity of hydroquinone and thereafter dehydrating the mixture at a temperature of −40° C. to +40° C. in the presence of magnesium perchlorate.

References Cited in the file of this patent

UNITED STATES PATENTS

| | | |
|---|---|---|
| 2,236,825 | Mares | Apr. 1, 1941 |
| 2,527,300 | Dudley | Oct. 24, 1950 |